Sept. 27, 1932.  D. H. COUCH  1,879,107
AIR OR GAS WASHER
Filed Nov. 7, 1930  4 Sheets-Sheet 1

Inventor
David H. Couch
By
Attorney

Sept. 27, 1932.  D. H. COUCH  1,879,107
AIR OR GAS WASHER
Filed Nov. 7, 1930  4 Sheets-Sheet 2

Inventor
David H. Couch
By
Attorney

Sept. 27, 1932. D. H. COUCH 1,879,107
AIR OR GAS WASHER
Filed Nov. 7, 1930 4 Sheets-Sheet 4

Inventor
David H. Couch
By
Attorney

Patented Sept. 27, 1932

1,879,107

UNITED STATES PATENT OFFICE

DAVID H. COUCH, OF DARIEN, CONNECTICUT

AIR OR GAS WASHER

Application filed November 7, 1930. Serial No. 494,153.

This invention relates to air or gas washers and particularly to that type of washer which depends on changing the direction of flow of the air or gas stream to throw the suspended or entrained solid or liquid particles carried by the air or gas against surfaces which are wetted with water or coated with other liquid, thus eliminating said entrained solids or liquids along with the wetting liquid.
A particular object of the invention as exemplified in the preferred embodiment described in the present specification is to provide a washer of compact design and high capacity and efficiency under all load conditions, for removing the ash and cinders from the flue or stack gases issuing from steam boilers or other furnaces.

Other objects will appear in the specification and claims appended hereto.
The usual type of air washer is dependent on a reversal of the flow of air or gas for throwing the entrained particles against wetted plates. The washer herein described depends on the operation of centrifugal force due to passing the air or gas at high velocity through circularly curved passages which are wetted with water or other liquid, to collect the entrained particles and carry them away with the wetting liquid.
It is well known that by passing air or gas, carrying entrained solids, through a cyclone type collector a large percentage of the solid particles are thrown by centrifugal force to the outer periphery of the collector. The invention herein described uses the same principle in part, in that centrifugal force is employed to throw the solid or heavier particles against curved plates which are kept wetted by water or other liquid, so that the entrained particles carried by the gas stream will be trapped by the wetting liquid and eliminated with it from the gas stream.

It will be obvious from the following description that the invention is of wide application, and its principles apply to the separation of any particles whether liquid or solid from any gaseous medium, whether air, flue gas, illuminating gas, or the like. Furthermore, any suitable liquid may be employed for wetting the surfaces of the curved passages and for entraining the foreign particles which it is desired to separate from the gas stream. According to the herein described embodiment of the invention, the gas stream employed is flue gas, containing cinders as foreign material, and the wetting liquid is preferably water. In the following description and accompanying claims, therefore, it is intended that the term "fluid" or "liquid" be construed broadly to cover any wetting liquid and the term "gas" is intended to cover any gaseous medium.

In the invention herein described one circularly curved passage with wetted surface may be used but preferably a multiplicity of such circularly curved passages in parallel are employed, forming narrow passages through which the gas flows so that each solid particle will only have to be thrown a short distance from its original path to be caught by the water or other liquid on the wetted surface. According to the invention in its preferred form therefore, the gas washer has a multiplicity of approximately parallel circularly curved vertical plates or surfaces between which channels are formed for the flow of the gas. These surfaces may be wetted from the top by spraying or showering water or other liquid onto them from above or may be wetted in sections at intervals to insure that they are kept thoroughly wetted at all times. If wetted only by spraying or showering from the top the rapid flow of gas through the passages might tend to carry the liquid across the surfaces in a diagonal path with consequently less wetting of the surfaces and less perfect cleaning of the gas. Also if the gas is heavily laden with foreign matter such as cinders, it would be preferable to have the surfaces wetted in sections and have each section so constructed as to eliminate as much of the water and entrained solids as possible at the bottom of each particular section rather than to allow too much foreign matter to be carried on with the gas requiring elimination at or near the discharge ends of the gas passages.

Vertical or diagonal ridges or preferably ridges with pronounced shoulders or hooked portions may be provided to confine the wash liquid and entrained solids as much as possible to its particular section. Liquid is therefore supplied to the leading side of each section from vertical or diagonally inclined perforated pipes or channels or hollow portions of the plates themselves. This insures uniform wetting of each section. In addition to this the surfaces may be sprayed or strong showers or streams of liquid may be directed from above onto the plates especially near the shouldered or hooked portions of the surfaces for keeping these portions of the surfaces thoroughly washed down.

Since certain velocities of the gas will be more effective than others for throwing out the solid particles, depending on the size and nature of the particles, the gas passages are preferably provided with dampers or means for closing off as many of the passages as desired to secure the most effective velocity of the gas through the remaining open passages or passage. In other words, if all the gas passages were kept in operation the apparatus would be most effective only over a limited range of rating, while by closing off of the passages as the flow of gas decreases the most effective cleaning of the gas can be maintained at all times. This feature, together with the advantages due to a multiplicity of passages noted above, insures high capacity and high efficiency under all load conditions.

In the foregoing, reference has been made especially to the trapping of solid or liquid particles carried by the gas stream. The same principles apply to the washing or dissolving of soluble gases which it may be desired to eliminate from the gas. As an illustration sulphur dioxide and sulphur trioxide are considered objectionable and dangerous gases and these are usually associated with the exit gas from boiler or industrial furnaces. These gases are quite readily soluble in water and may be largely or completely eliminated with the water.

A preferred embodiment of my invention is illustrated in the accompanying drawings, wherein:

Fig. 3 is a vertical transverse sectional view on line 3—3 of Fig. 2, showing a preferred arrangement of the housing and the water supply pipes.

Fig. 4 is a view partly in side elevation and partly in vertical section on line 4—4 of Fig. 2, showing means for simultaneously opening or closing the water supply pipe valve and gas damper of any particular gas passage.

Figs. 8 and 9 are diagrammatic views, similar to Fig. 2, of modified forms of the invention.

Figure 1:
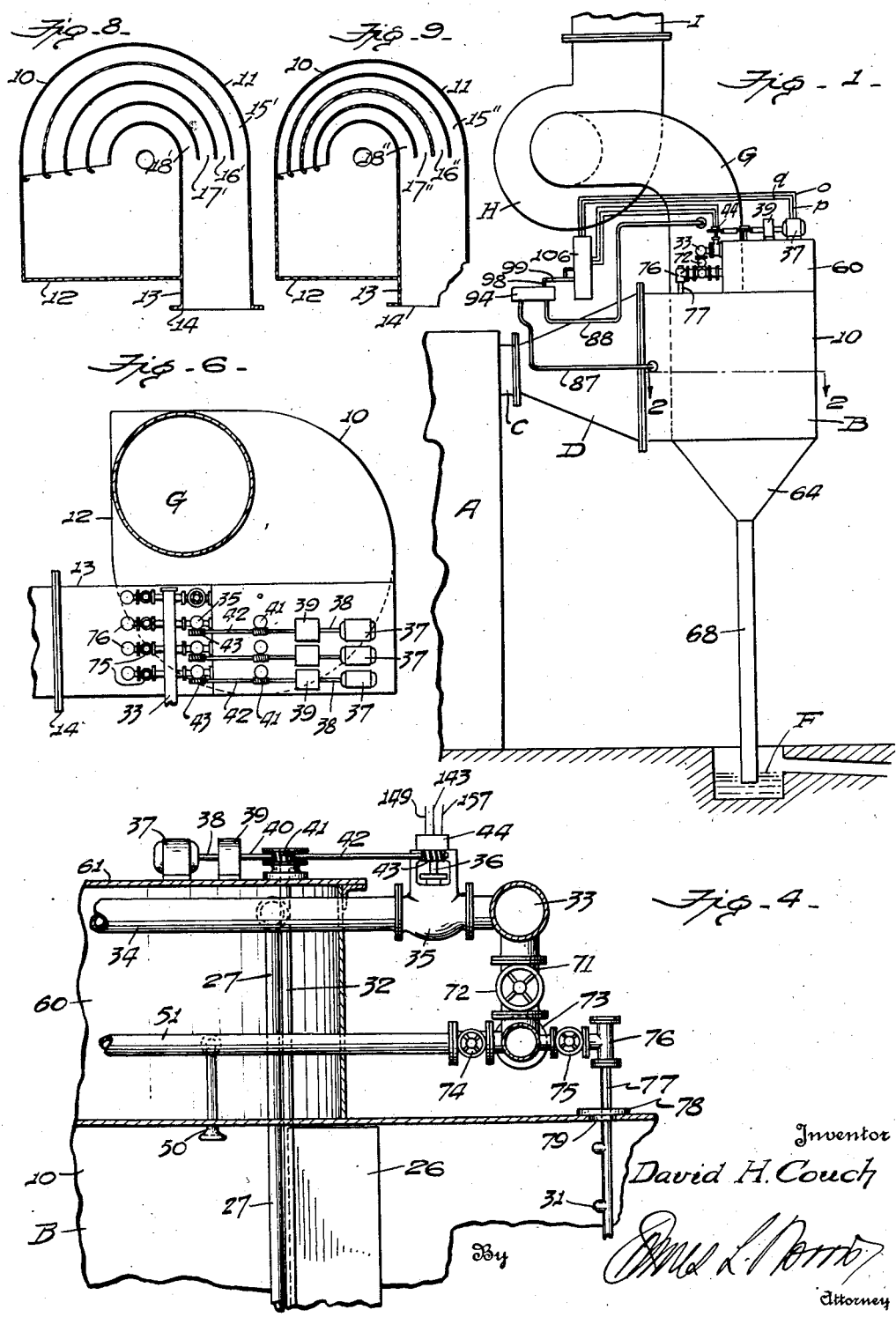
Fig. 1 is an elevation, largely diagrammatic, showing the washer applied to a power plant boiler.

Fig. 1 is a view largely diagrammatic in character, illustrating the invention as applied in a power plant to a boiler. In this figure, A represents a boiler furnace from which the flue gases to be cleaned pass to a washer B through connections C and D. The washer is of the centrifugal type and serves to separate impurities, including cinders and foreign gases such as $SO_2$ from the main gas stream. The liquid employed for purifying gases is preferably water which, together with the impurities, is discharged from the washer through a vertical pipe 68 into a water-seal F. The cleaned gas, after passing centrifugally through the washer is removed through a gas discharge passage G by the action of a fan H which in turn discharges through a pipe I.

Figure 2:
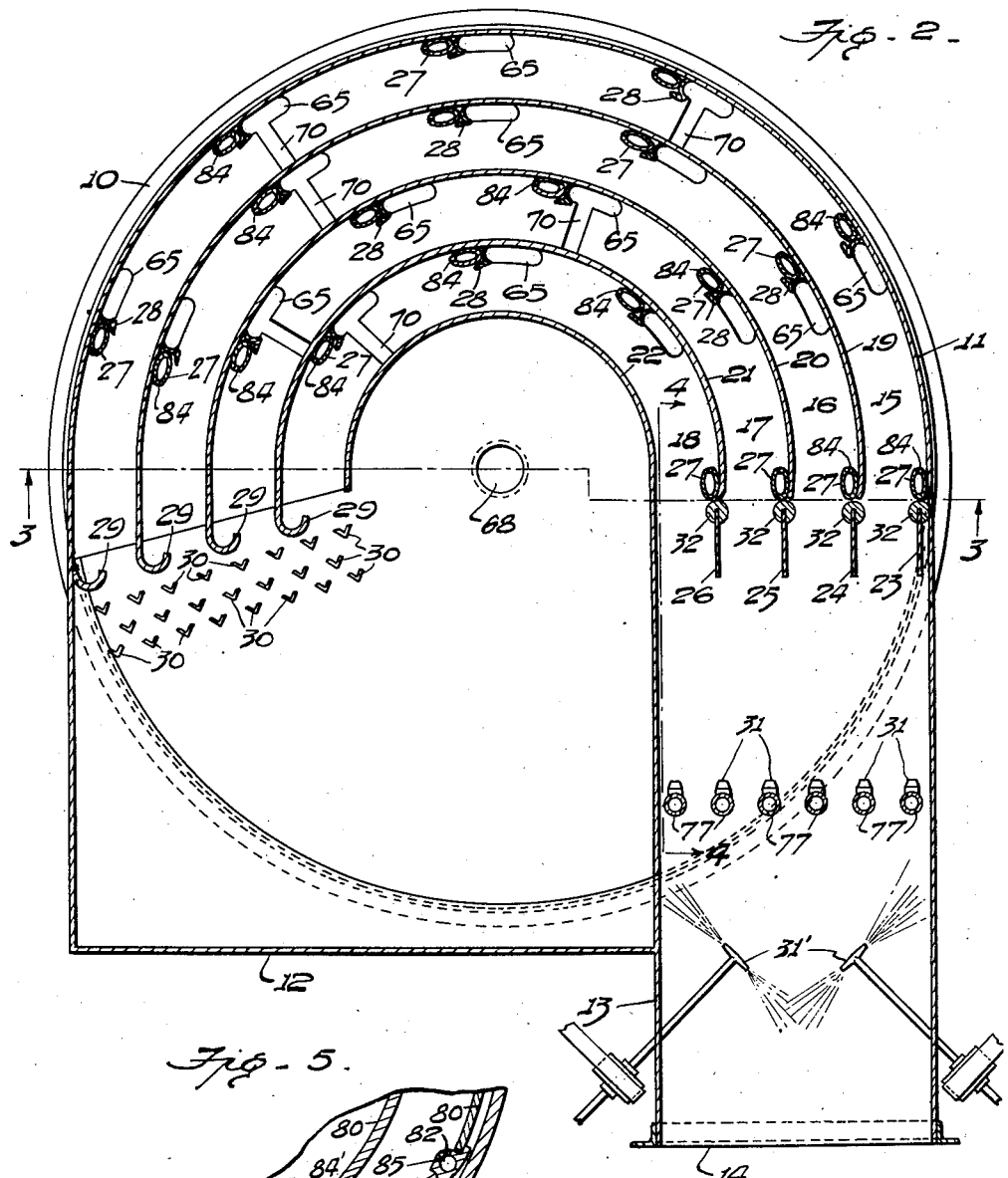
Fig. 2 is a horizontal sectional view of the washer on an enlarged scale, showing the general arrangement of gas passages, spray pipes, dampers and other mechanism, the view being taken on line 2—2 of Fig. 1.

The preferred construction of the washer is best shown by reference to Figs. 2, 3 and 4. As illustrated, the casing 10 of the washer includes parts 11, 12 and 13. The entrance to the washer is indicated at 14 and within its interior the washer is divided into a number of passages 15, 16, 17 and 18, herein shown as four in number. These passages are circularly curved and are formed by means of the outer wall 11 and a series of interior curved plates 19, 20, 21 and 22.

In order to control the velocity of gas passing through the washer, a plurality of dampers 23, 24, 25 and 26 are swingingly mounted on a plurality of shafts 32. By means of this arrangement, any one or all of the passages 15, 16, 17 or 18 may be cut off in whole or in part, but preferably all passages in operation should be wide open.

For the purpose of absorbing the impurities from the gases, water or other cleansing liquid is supplied adjacent each of the curved plates 11, 19, 20 and 21, as well as within the lead-in passage adjacent the entrance 14.

As shown, the main water supply consists of a series of substantially vertical pipes 27. As most clearly illustrated in Fig. 2, these pipes are located adjacent the concave surfaces of the curved baffle plates and are located at spaced intervals so as to insure wetting of each of the curved surfaces. These pipes are provided with a plurality of discharge openings 84 located at intervals along the length of the vertical pipes and facing in the direction of flow of the gases.

Desirably, a plurality of vertical hooked members 28 are located one in front of each of the pipes 27, the purpose being to confine the liquid to the particular section between successive water pipes. In this manner, it has been found that more effective use of the wetted surface is obtainable. In addition to the hooks 28, a plurality of hooks 29 are preferably formed integral with the discharge ends of the curved plates 11, 19, 20 and 21, the purpose being to prevent water from being carried out of the washer with the gases. Beyond the hooks 29 a plurality of substantially vertical members 30 substantially V-shaped in cross section are provided for the purpose of arresting any liquid which may have escaped from the curved passages. It will be noted that the members 30 are arranged in rows in staggered relation, this arrangement increasing the effectiveness of the separation.

Desirably, the gas stream is washed within the entrance passage 14 prior to its admittance to the baffled portion of the washer. As shown, this is accomplished by means of a plurality of revolving sprays 31' which may be supplemented by suitable stationary sprays 31, as most clearly illustrated in Fig. 2 of the drawings. It will be obvious that by wetting the solid impurities within the flue gases, their weight is increased and they are accordingly more readily thrown out of the gas stream by means of the curved baffle plates employed in the washer. Likewise, gases such as $SO_2$ are absorbed by the wash water and are thus removed from the gas stream. Instead of using water sprays, steam sprays may be employed if desired. Where gases other than flue gases are being purified, it is obvious that other cleansing liquid may be substituted for water in accordance with the requirements of the particular circumstances.

The gas to be cleaned entering the washer at 14 is partially humidified by the sprays 31 and 31' in the entrance passage. The velocity of the gases may be controlled by suitably regulated dampers 23, 24, 25 and 26 in accordance with the requirements in the particular case. The circular curvature of the plates 11, 19, 20, 21 and 22 causes the solid particles carried by the gas to be separated therefrom and thrown toward the outer periphery of the gas passages. Here, the impurities are kept wetted or flooded with water which preferably is admitted at intervals all along the outer surfaces of the passages, and this water runs down into the discharge pipe 68 carrying with it the solid particles which are thus removed from the gas, and an effective cleansing operation is insured.

Since, as above described, my invention contemplates the selective closing of one or more of the individual passageways by means of suitable dampers, it is obvious that it will be frequently desired to cut off the water supply to the passageway which is closed by its respective damper. Accordingly, means are provided for opening or closing the gas damper and water supply valve to each passage simultaneously. This arrangement is most clearly illustrated in Fig. 4. In this figure, only one damper 26 is illustrated, it being obvious that the same arrangement may be employed in connection with each of the dampers for each set of water supply pipes 27.

Figure 7:
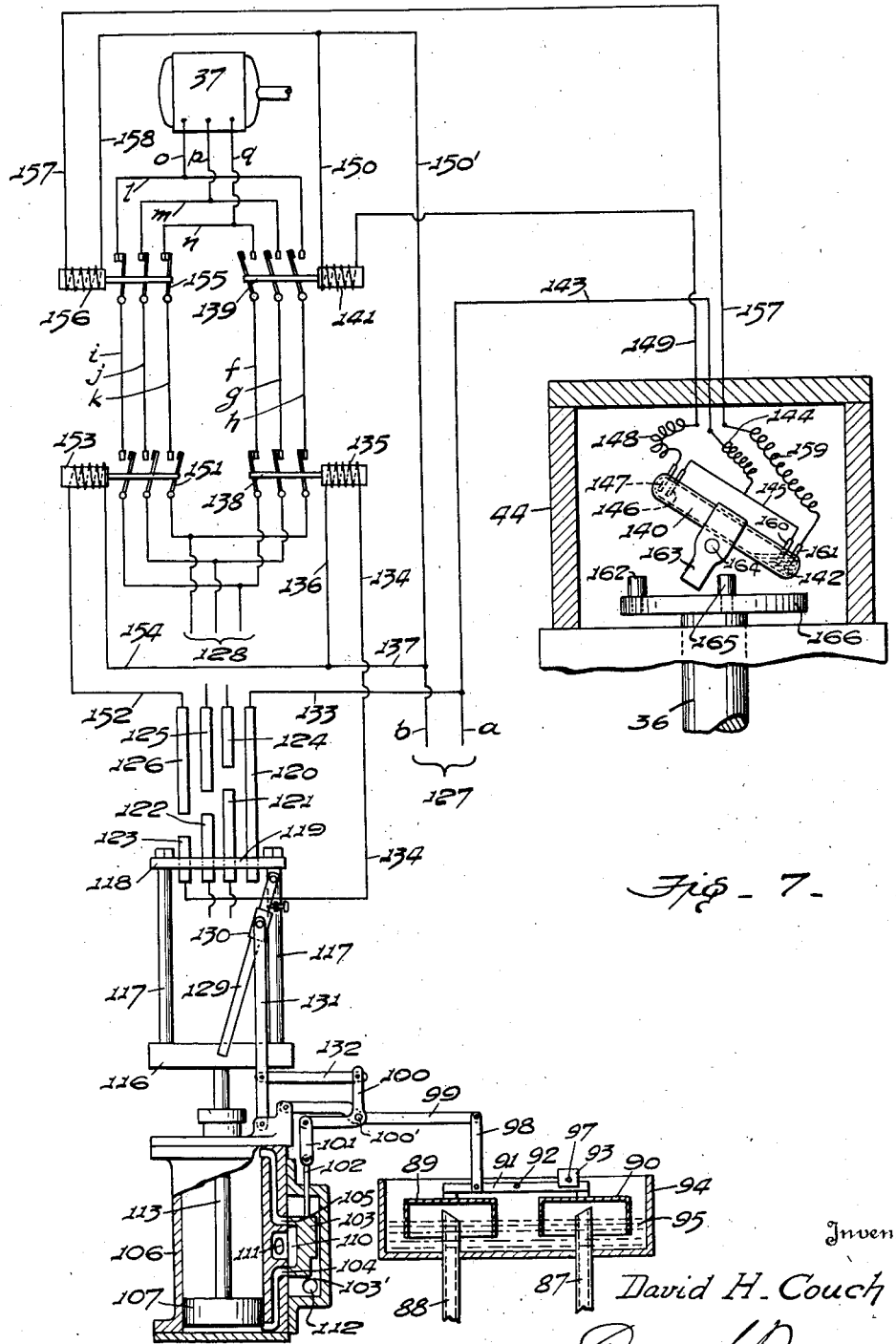
Fig. 7 is a diagrammatic view of the mechanism for controlling the motors as the flow of gas through the washer increases or diminishes.

The reference numeral 33 denotes a main water supply header, while 34 denotes a branch header supplying water to the gas passage controlled by one of the dampers 26. The water supply to the branch header 34 is controlled by means of a suitable valve 35 which is actuated simultaneously with the movement of the damper 26 by suitable mechanism to be described. As shown, an electric motor 37 is connected through shaft 38 and reduction gear 39 to a shaft 40 which carries a worm meshing with a worm wheel 41 keyed to the upper end of the shaft 32 for actuating the damper 26. The shaft 40 has an extension 42 which carries a worm 43 meshing with a worm wheel keyed to the stem 36 of the water valve 35 for actuating said valve simultaneously with the damper 26. In this manner, it is obvious that the same power which actuates the damper 26 simultaneously actuates the water valve 35 to open or close the supply of liquid to the curved gas passage according as the damper 26 is opened or closed. A limit switch, diagrammatically illustrated at 44 in Fig. 4 and in detail in Fig. 7, is employed for stopping the motor 37 when the valve 35 reaches the wide open or completely closed position. Obviously, the above described manner of operating the damper 26 and valve 35 is only one of many possible methods and is set forth for purposes of illustration only. Hydraulic or pneumatic cylinders with connecting rods and bell cranks or other known mechanical means for interconnecting the valve and damper may be employed if desired.

The above described arrangement for simultaneously operating the damper 26 and valve 35 is preferably applied in connection with each of the four gas passages 15, 16, 17 and 18. In addition to the header 34 supplying water to the inner passage 18, three other headers herein designated as 45, 46 and 47 are employed for supplying water to the passages 17, 16 and 15 respectively, this arrangement being illustrated in Fig. 3. Each header is connected to the individual supply pipes 27 by means of valves 48 and T connections 49. The valves 48 permit the water to be shut off from any individual supply pipe 27 as desired. The T connections are each provided with removable plugs 58 to permit cleaning the water pipes 27.

In addition to the main water supply pipes 27, a plurality of auxiliary flooding or showering sprays 50 may be employed, discharging continuously or at intervals into the gas passages 15, 16, 17 and 18. These sprays are supplied with water from branch headers 51, 52, 53 and 54 through valves 55 and T's 56. The branch headers are connected to the main water supply by suitable means. In Fig. 4, the connection between one of the shower headers 51 and the main water supply 33 is illustrated. The same arrangement is employed in connection with each of the other branch headers 52, 53 and 54. The main header 33 is connected to an auxiliary header 73 which supplies the shower headers 51 etc. by means of a pipe connection 71 having a cut-off valve 72 therein. Between the header 73 and the shower headers as 51, 52, 53 and 54, cut-off valves 74 are located so that any one of these headers may be cut out for cleaning or repair purposes.

The nozzles 31 (Figs. 2 and 4) may be supplied with water from the auxiliary header 73 through valves 75 and T's 76 by means of suitable pipe connections 77. T joints are preferred to elbows for the reason that this arrangement facilitates cleaning of the water supply pipes by means of a brush or swab with a minimum of effort.

Desirably, collars 78 are attached to pipes 77 to permit ready removal of the pipes with the nozzles 31 through openings 79. As previously described, any water pipe 27 may be shut off when desired by operating its respective valve 48 and similarly any of the showering sprays 50 may be shut off by actuating one of a number of valves 55 corresponding with the individual showering sprays 50. This permits cleaning of the showering sprays at intervals by removing the plugs 56 and inserting a suitable brush or swab.

To permit access for cleaning purposes, openings are provided in the top of the casing 10 above the pipe lines which are normally closed by means of plates, one of which is indicated by the numeral 57 in Fig. 3. It will be understood that there are large numbers of such openings and covers corresponding with the pipe lines to be cleaned.

It will be noted that the washer, as indicated in Fig. 3, is divided into several sections. The upper section houses the various headers for the water supply pipes and is separated from the intermediate section by means of a partition 59. This partition is perforated at intervals by means of the pipes passing therethrough. Accordingly, it is difficult or impossible to prevent air or gas leakage through these openings when the washer is in operation under suction or pressure. Accordingly, the upper chamber is made substantially air-tight and includes side walls 60 and a top 61 provided with a central opening having a cover plate 63. The purpose of the central opening is to permit an operator to enter the upper chamber 70 for the purpose of operating the valves or for cleaning and repair purposes. The intermediate section comprises the gas washer proper, the details of which have been described, and this section is separated from a lower section 64 by means of a partition 66 having a plurality of spaced apertures 65 formed therein to permit the washing liquid and the impurities entrained therewith to pass from the central section into the lower section 64. As shown in Fig. 2, the openings 65 are located at spaced intervals adjacent the successive water supply pipes 27. Occasional openings 70 extending substantially at right angles to the openings 65 entirely across the gas passages may be provided to permit any water which is being blown along the floor 66 to wash the solids accumulating on the floor into the lower chamber.

The lower chamber 64 is provided with a conical wall surface 67 which directs the fluids into the vertical passage 68 leading to the water-seal F (Fig. 1) and thence to discharge.

Figure 5:
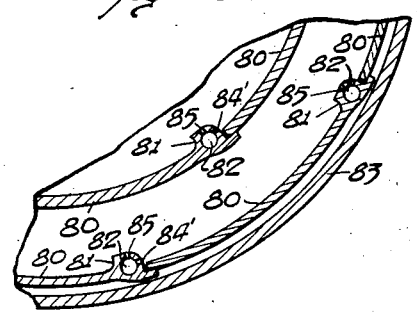
Fig. 5 is a fragmentary, horizontal, sectional view, similar to Fig. 2, but showing a modification in which the plates or surfaces forming the gas passages are paralleled with water supply pipes or passages formed integral with the plates.
Figure 6:
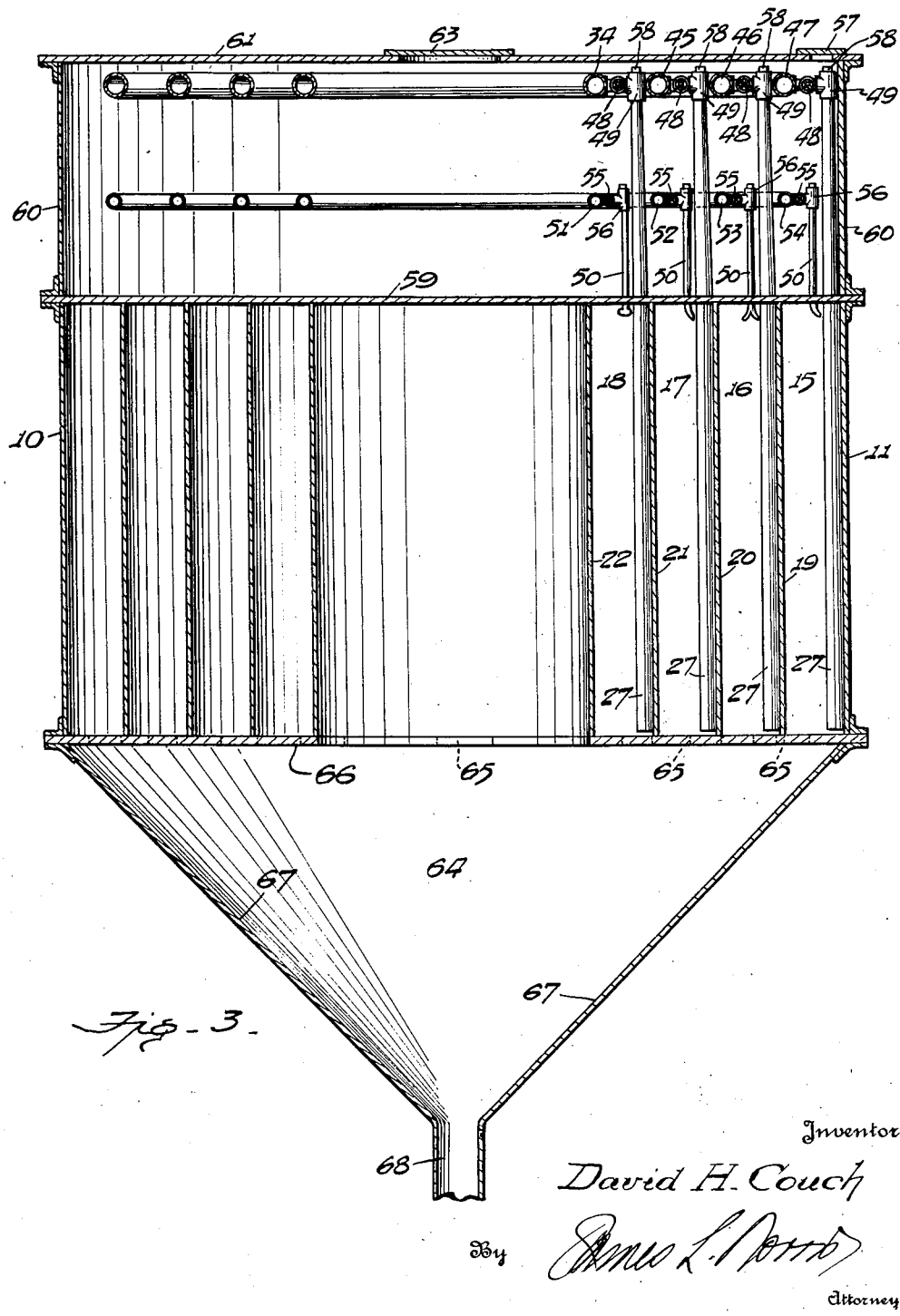
Fig. 6 is a horizontal section of Fig. 1, taken above the motors which control the dampers and valves.

Obviously the invention is subject to many modifications without departing from the broad principles thereof. For example, the circularly curved baffle plates 11, 19, 20 and 21 disclosed in Fig. 2, may be formed each of a plurality of separate sections 80—80, each section carrying therewith an integral water channel 82, and bucket portion 81, as illustrated in the modification shown in Fig. 5. In this view, the reference numerals 84' designate the openings through which water is normally discharged for the purpose of wetting the surface of the curved plates. In addition to the openings 84', each water channel may be provided with openings 85, the purpose of which is to direct water across the gas channels onto the convex surfaces of the opposite plates to prevent accumulation of foreign matter on such convex surfaces. In the modification just described, the curved plates 80—80 are preferably entirely separate and independent of the outer housing 83.

The automatic electrical control of the dampers 23—26 and water valves 35 to the individual gas passages is as follows:

As shown in Fig. 7 the washer is operating with all of the gas passages open. Bell floats 89 and 90 which are suspended from beam 91 and pivot 92 are partially immersed in an oil bath 95 in container 94. Float 89 is in communication with the discharge side of the washer by means of pipe connection 88, and float 90 communicates with the inlet side of the washer through pipe 87. Since the gas flows through the washer from the inlet to the outlet, there will be a drop in pressure between these points due to friction or a lower absolute pressure in float 89 than in float 90. Experience with each particular installation or type of installation will demonstrate what differential pressure gives best results and weight 93 can be moved along beam 91 to the correct position to give this differential pressure. Weight 93 is then clamped in this position by means of set screw 97. To prevent excessive travel of the floats in either direction stops are provided. In the embodiment shown, the pipes 87 and 88 act as stops for the bell floats. The ends of these pipes are therefore shown beveled to preclude any possibility of the top of the float closing off the pipe when resting on it.

In the position shown, all of the gas passages controlled by the differential pressure regulator are open and the differential pressure is such as to hold the floats 89 and 90 in their mid-position and piston 107 in regulator cylinder 106 at the bottom of its travel. Should the flow of gas through the washer increase, the differential pressure would increase and float 89 would be forced down by atmospheric pressure and might rest on the stop portion of pipe 88. Such movement would not be communicated to the dampers, however, because all gas passages are open as stated above, and piston 107 is at the bottom of its travel. On the other hand, if the flow of gas through the washer decreases, the differential pressure will decrease and bell float 90 will move downward due to the weight 93, thus causing link 98 and lever 99 to move upward.

The upward movement of lever 99 causes lever 100 to move upward with it, taking along link 101, pilot valve stem 102 and pilot valve 103. Air or liquid under pressure is continually supplied to valve chest 103' through supply pipe 112. A slight upward movement of valve 103 will open port 104 to admit fluid from chest 103' to the bottom of the cylinder 106. Said upward movement of valve 103 will simultaneously open port 105 and thus release the fluid from the cylinder above piston 107 to exhaust chamber 110 and thence to discharge through the exhaust or drain pipe 111. Piston 107 will therefore move upward, carrying with it piston rod 113, cross head 116, rods 117, cross bracket 118, transverse electrical contactor or bridge 119, diagonal guide bar 129 and guide shoe 130.

Upward movement of guide bar 129 causes guide shoe 130 to move to the left, taking with it lever 131 and link 132. As link 132 is attached to lever 100, which is made in the form of a right angle and connected by fulcrum 100' to lever 99, any movement of link 132 towards the left will cause a downward movement of link 101, stem 102 and valve 103. This compensating movement of valve 103 closes ports 104 and 105 and thereby stops the movement of piston 107 before it has gone very far.

As long as bridge 119 remains in contact with bus 123, current will continue to flow between lines $a$ and $b$ of control circuit 127 through wire 133, bus 120, bridge 119, wire 134, magnet 135 and wires 136 and 137. This flow of current through magnet 135 holds switch 138 in its closed position and keeps lines $f$, $g$ and $h$ of power circuit 128 energized as far as switch 139. Switch 139 admits electricity to motor 37 in the proper relation to open the damper and water supply valve to the gas passage to which it is connected. Since, as described above, the damper and water supply valve are open for the purpose of this description switch 139 is open and cannot close because the mercoid limit switch 140 is in the open position for control magnet 141. It will be seen from the drawings that with the mercury 142 in the right hand end of mercoid switch 140, no control current can flow between supply lines $a$ and $b$ of control circuit 127 through wires 143, 144, 145, contact points 146 and 147, wires 148, 149, magnet 141 and wires 150 and 150'.

As long as bridge 119 remains in contact with bus 123, switch 138 will remain closed, as described above, and reversing switch 151 will remain open since no control current can flow between lines $a$ and $b$ of control circuit 127 through wire 133, bus 120, bridge 119, bus 126, wire 152, magnet 153, and wires 154 and 137.

When the flow of gas through the washer has decreased sufficiently to lower the differential pressure enough to cause the piston 107 to move high enough to just break electrical connection of bridge 119 with bus 123, switch 138 will drop open because of being released by magnet 135. Therefore, as long as bridge 119 remains out of contact with buses 123 and 126, both reversing switches 138 and 151 will remain open. If the flow of gas continues to diminish through the washer, the differential pressure will decrease further and piston 107 will move higher until bridge 119 makes contact with bus 126. When such contact is made control current will flow between lines $a$ and $b$ of circuit 127 through wire 133, bus 120, bridge 119, bus 126, wire 152, magnet 153 and wires 154 and 137, thus energizing magnet 153 and closing switch 151.

It will be seen from the drawings that with the limit switch 140 in the position shown, switch 155 will be held in the closed position by current flowing between $a$ and $b$ of circuit 127 through wires 143, 144, 145, contact points 160 and 161, wires 159 and 157, magnet 156 and wires 158 and 150'. Therefore, when switch 151 closes as above described, current will flow through wires $i$, $j$, $k$, switch 155, and wires $l$, $m$, $n$, and $o$, $p$, $q$ to motor 37 controlled by buses 123 and 126, and cause motor 37 to rotate in the proper direction to close the damper and water supply valve connected to this motor. This rotation of the motor 37 will continue until the limit switch 140 is tripped in the opposite direction by pin 162 pushing pivoted support 163 of mercoid switch 140 far enough so the center of gravity of limit switch 140 is thrown to the left of pivot 164. Tripping of the limit switch 140 in this manner will open switch 155 by breaking the current flow to magnet 156 and will by the same movement close switch 139 by energizing magnet 141.

The damper and water supply valve will remain closed until such time as the change in differential pressure between inlet and outlet of the washer is such as to cause piston 107 to move downward far enough to cause bridge 119 to again contact bus 123. Pins 162 and 165, carried by the disc 166 attached to the valve stem 36 of the water supply valve 35, serve to trip the limit switch 140 at the proper time to stop motor 37 when the damper and valve reach their closed or wide open positions.

Buses 122 and 125 control a motor to another gas passage and buses 121 and 124 control a motor to a third gas passage, etc.

I have shown motor supply circuit 128 as a three-wire, three-phase circuit. Three-phase alternating current is always available in modern power plants, while direct current is usually not available. Moreover, a three-phase A. C. motor may readily be reversed by interchanging two of the wires as shown. Other reversing types of motors could be used requiring only two wires.

For simplicity of construction it will usually be preferable to so mount the plates 19, 20, 21, and 22 relatively to the outer wall 11 and to one another that their opposed circularly curved surfaces will be parallel to one another and thus form passages 15, 16, 17 and 18 having the same width from their inlet to their outlet ends, as shown in Figure 2. However, in some cases it may be desirable that the velocity of the gas, even when the dampers 23, 24, 25 and 26 are fully open, shall decrease toward the outlet of the washer. In such cases said plates may be so mounted relatively to said outer wall and to one another that their opposed curved faces will diverge toward the outlet end of the washer and form passages 15', 16', 17' and 18' of which the width will increase toward their outlet ends, as shown in Figure 8. In other cases it may be desirable that the velocity of the gas, even when the dampers 23, 24, 25 and 26 are fully open, shall increase toward the outlet of the washer. In such cases said plates may be so mounted relatively to said outer wall and to one another that their opposed curved faces will converge toward the outlet end of the washer and form passages 15", 16", 17" and 18" of which the width will decrease toward their outlet ends, as shown in Figure 9. In general, especially in the case of flue or stack gases, the temperature of the gas will be lowered appreciably in passing through the washer because of coming in contact with the wash water which is colder than the gas. The effect of this will be to decrease the volume of the gas and, therefore, to decrease its velocity. Therefore, if maximum cleaning of the gas is desired it will be necessary to maintain even velocity of the gas by decreasing the area of the passages. This may be done by decreasing the width or height of the passages or both as may be preferred.

What I claim as new and desire to secure by Letters Patent of the United States is:

1. An air or gas washer including a gas cleaning chamber, a foul gas inlet to the chamber, a clean gas outlet, and means for producing a forced draft through the chamber, said chamber comprising a plurality of circularly curved gas passages bounded by upright circularly curved plates and a bottom plate having openings spaced apart along each of said passages, means for wetting the convex sides of said curved surfaces to absorb the impurities of the gases passing through the chamber, a plurality of upright pipes located at spaced intervals along the concave sides of said curved surfaces, each of said pipes having vertically spaced perforations facing in the direction of gas flow, and a plurality of vertical trough-like members disposed along the concave surface of each of said curved plates, one between each of the openings in the bottom plate and one of said upright pipes and each directed toward said gas inlet.

2. An air or gas washer including a cleaning chamber having an impure gas inlet, and clean gas outlet, said cleaning chamber comprising a plurality of upright circularly curved plates forming a plurality of circularly curved gas passages between them for the flow of gas to be cleaned, means for supplying wetting liquid at spaced intervals to said curved surfaces for entraining foreign matter from said gas, an outlet below said cleaning chamber for removing the cleaning liquid and the absorbed impurities, and ridges at the discharge side of each wetted section to confine the liquid and entrained substances to the particular section.

3. An air or gas washer including a cleaning chamber having an impure gas inlet, and clean gas outlet, said cleaning chamber comprising a plurality of upright circularly curved plates forming a plurality of circularly curved gas passages between them for the flow of gas to be cleaned, means for supplying wetting liquid at spaced intervals to said curved surfaces for entraining foreign matter from said gas, an outlet below said cleaning chamber for removing the cleaning liquid and the absorbed impurities, and ridges having pronounced hooked portions at the discharge side of each wetted section to confine the liquid and entrained matter to said particular section.

4. An air or gas washer having circularly curved plates forming therebetween a circularly curved passage for the flow of gas to be cleaned, regulable means for wetting the curved plates, whereby foreign matter is removed with the wetting liquid, a damper adjacent the inlet end of said passage for controlling the velocity of the gas through the passage and means controlled by the difference between the pressure at the inlet of said passage and that at the outlet of said passage for simultaneously actuating said damper and regulating said plate wetting means.

5. An air or gas washer including a cleaning chamber consisting of a plurality of curved surfaces extending in the same general direction and forming therebetween a plurality of circularly curved passages for the flow of gas to be cleaned, means for wetting the concave curved surfaces of the cleaning chamber, whereby the foreign matter in the gas is entrained within the wetting liquid, a foul gas inlet to the cleaning chamber, a clean gas outlet leading from the chamber, a liquid outlet below the chamber for removing the wetting liquid and the entrained impurities, and means for controlling the velocity of the gas through each of the passages independently of the flow of gas through the other passages, said means including a damper in each passage and means controlled by the difference between the pressure at the inlet and outlet ends of each passage for actuating the damper of such passage.

6. An air or gas washer including a cleaning chamber consisting of a plurality of curved surfaces extending in the same general direction and forming therebetween a plurality of circularly curved passages for the flow of gas to be cleaned, means for wetting the concave curved surfaces of the cleaning chamber, whereby the foreign matter in the gas is entrained within the wetting liquid, a foul gas inlet to the cleaning chamber, a clean gas outlet leading from the chamber, a liquid outlet below the chamber for removing the wetting liquid and the entrained impurities, and means for controlling the velocity of the gas through the passages, said velocity controlling means comprising a plurality of independently regulable dampers, one located at the inlet end of each gas passage, and means controlled by difference between the pressure at the inlet and outlet ends of said passages for operating said dampers.

7. An air or gas washer including a cleaning chamber consisting of a plurality of curved surfaces extending in the same general direction and forming therebetween a plurality of circularly curved passages for the flow of gas to be cleaned, valved means for wetting the concave curved surfaces of the cleaning chamber, whereby the foreign matter in the gas is entrained within the wetting liquid, a foul gas inlet to the cleaning chamber, a clean gas outlet leading from the chamber, a liquid outlet below the chamber for removing the wetting liquid and the entrained impurities, and a plurality of independently regulable dampers for selectively cutting off one or more of the gas passages, and means controlled by the difference in pressure between the inlet and outlet ends of each of said gas passages for simultaneously regulating the damper thereof and the valve of the means for wetting the curved surface thereof.

8. An air or gas washer including a cleaning chamber consisting of a plurality of curved surfaces extending in the same general direction and forming therebetween a plurality of circularly curved passages for the flow of gas to be cleaned, means for wetting the concave curved surfaces of the cleaning chamber, whereby the foreign matter in the gas is entrained within the wetting liquid, a foul gas inlet to the cleaning chamber, a clean gas outlet leading from the chamber, a liquid outlet below the chamber for removing the wetting liquid and the entrained impurities, a plurality of independently regulable dampers for selectively cutting off one or more of the gas passages, and valve means for cutting off the liquid supply to any gas passage not in use.

9. An air or gas washer including a cleaning chamber consisting of a plurality of curved surfaces extending in the same general direction and forming therebetween a plurality of circularly curved passages for the flow of gas to be cleaned, means for wetting the concave curved surfaces of the cleaning chamber, whereby the foreign matter in the gas is entrained within the wetting liquid, a foul gas inlet to the cleaning chamber, a clean gas outlet leading from the chamber, a liquid outlet below the chamber for removing the wetting liquid and the entrained impurities, a plurality of independently regulable dampers for selectively cutting off one or more of the gas passages, and valve means for cutting off the liquid supply to any gas passage not in use, the damper and liquid supply valve for each individual gas passage being interconnected and simultaneously actuated.

10. An air or gas washer including a cleaning chamber consisting of a plurality of curved surfaces extending in the same general direction and forming therebetween a plurality of circularly curved passages for the flow of gas to be cleaned, valved means for wetting the concave curved surface of each of said passages, whereby the foreign matter in the gas is entrained within the wetting liquid, the valved means for wetting the concave curved surface of each of said passages being independent of the other valved means, a foul gas inlet to the cleaning chamber, a clean gas outlet leading from the chamber, a liquid outlet below the chamber for removing the wetting liquid and the entrained impurities, and fluid sprays within the foul gas inlet passage for wetting the gas before its entrance into the circularly curved passages.

11. An air or gas washer including a cleaning chamber consisting of a plurality of curved surfaces extending in the same general direction and forming therebetween a plurality of circularly curved passages for the flow of gas to be cleaned, means for wetting the concave curved surfaces of the cleaning chamber, whereby the foreign matter in the gas is entrained within the wetting liquid, a foul gas inlet to the cleaning chamber, a clean gas outlet leading from the chamber, a liquid outlet below the chamber for removing the wetting liquid and the entrained impurities, and revolving sprays within the foul gas inlet passage for wetting the gas before its entrance into the circularly curved passages.

12. An air or gas washer including a cleaning chamber consisting of a plurality of curved surfaces extending in the same general direction and forming therebetween a plurality of circularly curved passages for the flow of gas to be cleaned, means for wetting the concave curved surfaces of the cleaning chamber, whereby the foreign matter in the gas is entrained within the wetting liquid, a foul gas inlet to the cleaning chamber, a clean gas outlet leading from the chamber, a liquid outlet below the chamber for removing the wetting liquid and the entrained impurities, and revolving and stationary sprays within the foul gas inlet passage for wetting the gas before its entrance into the circularly curved passages.

13. An air or gas washer including a cleaning chamber comprising a bottom plate and a plurality of curved surfaces extending in the same general direction above said bottom plate and forming therebetween a plurality of curved passages for the flow of gas to be cleaned, said bottom plate having a plurality of openings disposed at intervals along each of said passages, means for wetting said concave curved surfaces comprising a plurality of upright pipes disposed along said concave surfaces each adjacent one of the openings in said bottom plate and each having perforations along its length directed in the same direction as the flow of gases through said passages, a foul gas inlet to the cleaning chamber, a clean gas outlet leading from the chamber, and means for spraying liquid onto the convex surfaces of the passages to prevent coating of such surfaces with solids from the gas stream.

14. An air or gas washer including a cleaning chamber having a plurality of passages for the flow of gas to be cleaned, means for supplying cleaning fluid to said passages, and means for opening and closing one or more of said passages and opening or closing said cleaning fluid supply means when the flow of gas increases or diminishes.

15. An air or gas washer including a cleaning chamber having a plurality of passages for the flow of gas to be cleaned, means for supplying cleaning fluid to said passages, and means governed by the flow of gas for opening and closing one or more of said passages and opening or closing the means for supplying cleaning fluid to said passages.

16. An air or gas washer including a cleaning chamber comprising a plurality of gradually expanding circularly curved passages in parallel for the flow of gas to be cleaned, a foul gas inlet to the cleaning chamber, a clean gas outlet leading from the chamber, a liquid outlet below the chamber for removing the wetting liquid and the entrained impurities, a source of liquid supply, a plurality of curved headers connected to said source and disposed, respectively, over said curved passages, a valve between said source and each of said headers, a plurality of pipes depending from each of said headers into the curved passage below the same, each of said pipes having a plurality of perforations along its length directed in the direction of gas flow, a damper for each of said passages and means for simultaneously opening and closing the damper of any one of said passages and the valve to the header associated with such passage.

17. An air or gas washer including a cleaning chamber consisting of a plurality of gradually contracting circularly curved passages in parallel for the flow of gas to be cleaned, a foul gas inlet to the cleaning chamber, a clean gas outlet leading from the chamber, a liquid outlet below the chamber for removing the wetting liquid and the entrained impurities, a source of liquid supply, a plurality of curved headers connected to said source and disposed, respectively, over said curved passages, a valve between said source and each of said headers, a plurality of pipes depending from each of said headers into the curved passage below the same, each of said pipes having a plurality of perforations along its length directed in the direction of gas flow, a damper for each of said passages and means for simultaneously opening and closing the damper of any one of said passages and the valve to the header associated with such passage.

In testimony whereof I have hereunto set my hand.

DAVID H. COUCH.